Patented Apr. 28, 1953

2,636,911

UNITED STATES PATENT OFFICE 2,636,911

SELECTIVE REMOVAL OF ACETYLENE FROM HYDROCARBON STREAMS

Gardner C. Ray, Bartlesville, Okla., assignor to Phillips Petroleum Company, a corporation of Delaware No Drawing. Application July 25, 1950, Serial No. 175,860

2 Claims. (Cl. 260—677)

This invention relates to the removal of acetylene from hydrocarbon streams, for example, from streams containing ethylene.

The production of olefins by cracking of hydrocarbons is a well-known process, especially the cracking of $C_2$ to $C_4$ paraffins to produce normally gaseous unsaturated hydrocarbons. An especially attractive method for producing ethylene is the process of cracking ethane or propane or mixtures thereof at relatively high temperatures with the production of high yields of ethylene.

In these processes, however, not only are ethylene and other olefins produced, but acetylene is produced in quantities large enough to cause trouble in separation of a relatively pure ethylene stream. In most instances, acetylene is highly undesirable in the product stream, for it is deleterious in a great many of the processes in which ethylene is used as the feed stock. This deleterious effect in many cases may be catalyst poisoning or the production of undesirable products.

Acetylene is a difficult material to remove completely from the product stream, for this material boils very close to ethylene. Acetylene also is quite similar to ethylene in adsorption characteristics and consequently it is highly desirable in most instances to remove the acetylene content by methods other than fractionation or adsorption.

This invention comprises a process for the removal of acetylene from ethylene-containing streams by passing the acetylene-containing stream over a catalyst obtained by adding ammonium phosphomolybdate to a suitable support and then subjecting the mass to conditions described herein. The purification step is carried out at superatmospheric temperature and a pressure of atmospheric or higher.

The catalyst may be prepared in several ways. A mixture of ammonium phosphomolybdate and alumina gel may be formed by mixing an ammoniacal ammonium phosphomolybdate solution with an aqueous suspension of alumina gel, evaporating the suspension to dryness, heating the mass in air, for example at 750° F., pelleting, and subsequently reducing the mass in hydrogen for 2 to 3 hours. The catalyst may also be formed by impregnating a granular or pelleted support of pumice, kieselguhr, silica gel, alumina gel, or other suitable support with an ammoniacal solution of ammonium phosphomolybdate and subsequently activating the mass by reduction in hydrogen. The amount of ammonium phosphomolybdate used is preferably such that the support of alumina or similar material comprises 75 to 95 weight per cent of the finally activated mass of catalyst. While the foregoing methods of preparation of the catalyst are preferred now it is obvious after a consideration of this disclosure that other methods of preparing the catalyst may be employed to obtain the reduced ammonium phosphomolybdate on a carrier.

The process is carried out by passing the stream containing the acetylene over the catalyst at a temperature in the range of 400° F. to 800° F., preferably in the range of 450° F. to 700° F. The flow rate may be as high as 1000 volumes of feed per volume of catalyst per hour, but preferably is in the range of 100 to 500 volumes per hour. The pressure is preferably about atmospheric, but may be as high as about 500 p. s. i. With increasing onstream time, the catalyst gradually loses activity, but removal of acetylene may be kept substantially complete by increasing the severity of the conditions as the catalyst declines in activity, for example by increasing the temperature. Upon too great a decline in the activity of the catalyst, the catalyst may be regenerated by oxidation of the deposit accumulated thereon by means of a stream of oxygen-containing gas, such as air or diluted air. Regeneration methods by which the catalyst of the invention can be regenerated are well known. After the oxidation the catalyst is prepared for use by a reduction step as outlined above.

By proper adjustment of the conditions of the process, substantially complete removal of acetylene may be effected without any substantial loss of ethylene.

Example I 30.9 grams of catalyst was used in this example. The catalyst was produced by adding an ammoniacal solution of ammonium phosphomolybdate to an aqueous suspension of alumina gel, and heated for two hours at 120° F. to 140° F., dried at 212° F., and then heated in a muffle furnace at 750° F. in a stream of air. The resulting material was then mixed with an organic binder and pelleted. The resulting pellets were then heated in hydrogen at 700° F. to drive off the binder. The catalyst was again reduced prior to use by hydrogen at 800° F. to 900° F. for 2½ hours.

The catalyst was tested by passing a feed mixture composed of 2.96 per cent acetylene, 27.6 per cent ethylene, 26.7 per cent ethane, 26.7 per cent hydrogen, and the remainder nitrogen over the 30.9 grams of catalyst at a flow rate of 70 cc. per minute at atmospheric pressure. At temperatures of 365° F. and less, some acetylene was present in the effluent. At 460° F., however, no acetylene was found in the effluent. The analysis showed no destruction of ethylene.

Example II

In a second test using the same portion of catalyst without regeneration, a mixture of 3 per cent acetylene and 97 per cent ethylene was passed over the catalyst at 630° F. No acetylene was present in the effluent.

The catalyst used in the above examples was analyzed for molybdenum oxide and phosphorus pentoxide and was found to contain 0.56 weight per cent phosphorus pentoxide and 12.20 weight per cent molybdenum oxide. These values were for the catalyst prior to the final reduction before use. The alumina content of the catalyst, calculated by difference, was 87.24 weight per cent.

The ratio of the oxides of phosphorus and molybdena in the catalyst may, of course, vary somewhat; and the particular ratio to be employed in the final catalyst is determined by the particular heteropoly acid or mixture of acids originally employed in the impregnation of the support.

Reasonable variation and modification are possible within the scope of the foregoing disclosure and the appended claims to the invention the essence of which is that a catalytically active mass prepared by adding ammonium phosphomolybdate to a suitable support and then reducing the mass thus obtained at an elevated temperature can be employed to remove acetylene from a stream of hydrocarbons containing the same and that a process for so doing has been set forth.

I claim:

1. The removal of acetylene from a stream of hydrocarbons containing it and ethylene which comprises passing said stream at a temperature in the range of about 400° F. to about 800° F. over a catalyst obtained by admixing an ammoniacal solution of ammonium phosphomolybdate with an aqueous suspension of a carrier, the mixture heated for about two hours at a temperature in the range of from about 120° F. to about 140° F., then evaporated to dryness at about 212° F., then heated at a temperature of about 750° F. in air, and then reduced by hydrogen at a temperature in the range of 800° F. to 900° F. for a period in the range of from about 2 to about 3 hours, the carrier being present in the catalyst in a per cent by weight in the range 75 to 95, the remainder being the product of the reduction of the said ammonium phosphomolybdate upon the said carrier.

2. The removal of acetylene from a stream of hydrocarbons containing it and ethylene which comprises passing said stream at a temperature in the range of about 400° F. to about 800° F. over a catalyst obtained by admixing an ammoniacal solution of ammonium phosphomolybdate with an aqueous suspension of alumina gel, the mixture heated for about two hours at a temperature in the range of from about 120° F. to about 140° F., then evaporated to dryness at about 212° F., then heated at a temperature of about 750° F. in air, and then reduced by hydrogen at a temperature in the range of 800° F. to 900° F. for a period in the range of from about 2 to about 3 hours, the alumina being present in the catalyst in a per cent by weight in the range 75 to 95, the remainder being the product of the reduction of the said ammonium phosphomolybdate upon the said carrier.

GARDNER C. RAY.

References Cited in the file of this patent

UNITED STATES PATENTS

| Number | Name | Date |
|---|---|---|
| 1,842,010 | Braus | Jan. 19, 1932 |
| 1,910,837 | Jaeger | May 23, 1933 |
| 2,325,015 | Turkevich | July 20, 1943 |
| 2,359,759 | Hebbard et al. | Oct. 10, 1944 |

OTHER REFERENCES

Berkman et al., Catalysis (Reinhold Publ. Co., 1940), pp. 850, 852, 854, 873.